(12) United States Patent
Goto et al.

(10) Patent No.: US 6,487,239 B1
(45) Date of Patent: Nov. 26, 2002

(54) METHOD AND APPARATUS FOR MESSAGE COMMUNICATION

(75) Inventors: Hiroyuki Goto, Hino (JP); Masato Michinaka, Hino (JP); Hirofumi Shimizu, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/242,454

(22) PCT Filed: Jun. 18, 1998

(86) PCT No.: PCT/JP98/02717

§ 371 (c)(1),
(2), (4) Date: Feb. 17, 1999

(87) PCT Pub. No.: WO98/58488

PCT Pub. Date: Dec. 23, 1998

(30) Foreign Application Priority Data

Jun. 18, 1997 (JP) .............................................. 9-161620

(51) Int. Cl.$^7$ ................................................. H04B 1/38
(52) U.S. Cl. ...................... 375/219; 375/220; 379/93.09
(58) Field of Search ................................. 375/219, 220; 455/511, 515, 517, 524, 553, 554, 555, 557, 560; 379/90.01, 93.04, 93.09, 93.14, 100.15, 100.16, 100.17

(56) References Cited

U.S. PATENT DOCUMENTS

| | | | | |
|---|---|---|---|---|
| 4,975,900 A | * | 12/1990 | Murata et al. ............... | 370/420 |
| 5,493,609 A | * | 2/1996 | Winseck et al. .......... | 348/14.12 |
| 5,521,719 A | * | 5/1996 | Yamada ...................... | 358/435 |
| 5,802,472 A | * | 9/1998 | Taniguchi ................... | 370/311 |
| 5,889,842 A | * | 3/1999 | Azami ........................ | 358/468 |
| 6,047,176 A | * | 4/2000 | Sakamoto et al. .......... | 455/422 |

FOREIGN PATENT DOCUMENTS

| | | |
|---|---|---|
| JP | 02206947 | 8/1990 |
| JP | 04167752 | 6/1992 |
| JP | 05268304 | 10/1993 |
| JP | 05316109 | 11/1993 |
| JP | 06334776 | 12/1994 |
| JP | 07023039 | 1/1995 |
| JP | 07231477 | 8/1995 |
| JP | 08274895 | 10/1996 |
| JP | 09153955 | 6/1997 |

\* cited by examiner

*Primary Examiner*—Chi Pham
*Assistant Examiner*—Khanh Cong Tran
(74) *Attorney, Agent, or Firm*—Finnegan, Henderson, Farabow, Garrett & Dunner, L.L.P.

(57) ABSTRACT

A method and an apparatus for performing message communication accurately at high rate even when the communication line is busy. When the communication line between the message transmitting side and the message receiving side connected with an ISDN network is busy, the call between the message transmitting side and the message receiving side is temporarily interrupted and then a message is transmitted automatically from the message transmitting side to the message receiving side by using call setting information where a transmission message is set in a subaddress.

30 Claims, 12 Drawing Sheets

METHOD AND APPARATUS FOR MESSAGE COMMUNICATION

TECHNICAL FIELD

The present invention relates to a method and an apparatus for message communication between telecommunications terminals connected to an integrated services digital network, and more particularly to a method and an apparatus for message communication capable of highspeed, high quality message communication during a call.

BACKGROUND ART

Recently, a method and an apparatus for message communication, which, in addition to ordinary calls, is capable of communicating messages between wired telecommunications terminals wire-connected to an ISDN (integrated service digital network), or between wireless telecommunications terminals, for example, PHS (Personal Handyphone System) and other portable telecommunications terminals, wirelessly-connected via a radio base station to an integrated service digital network, has been proposed.

This type of message communication method and apparatus is constituted so that predetermined message information prepared in advance, or message information inputted using a keypad is transmitted from a message transmitting terminal to a message receiving terminal, and the message receiving terminal displays this received message information on a display or the like.

Incidentally, as this type of message communication method and apparatus, 1) a system, which utilizes DTMF (dual tone multi-frequency) signals; and
2) a system, which at call setting utilizes a subaddress contained in call setting information, have been proposed.

Here, because 1), the system that utilizes DTMF signals, can be used even between telecommunications terminals that are in the midst of a call, the degree of freedom of message communication increases. However, since the message communication thereof not only requires time, but also suffers from numerous line quality-caused transmission errors, if, for example, the telecommunications terminal is a PHS or other wireless terminal, this system is unsuitable for transmitting data that must be accurate, such as telephone directory information.

Further, since 1), the system that uses a subaddress contained in call setting information at call setting, is capable of transmitting messages at highspeed, and line quality-caused transmission errors are few, even when the telecommunications terminal is a PHS or other wireless terminal, accurate, highspeed message transmission is possible. However, the problem is that because call setting information comprise signals that are sent from a call-originating terminal to a call-terminating terminal only at call setting, this system cannot be used during a call, for example, when one wants to send data to the called party while a call is in progress.

Thus, a system that performs message communication using conventional DTMF signals is advantageous in that it can be used even between telecommunications terminals that are in the midst of a call, but because the transmission rate is slow, and there are numerous line quality-caused transmission errors, this system is not suitable for transmitting accurate message information using, for example, a PHS or other wireless terminal. Further, because a system that uses a subaddress contained in call setting information at call setting is capable of transmitting messages at highspeed, and generates few line quality-caused transmission errors, message transmission can be performed accurately and at highspeed between PHS or other wireless terminals, but the problem is that since call setting information comprise signals that are sent from a call-originating terminal to a call-terminating terminal only at call setting, this system cannot be used during a call, for example, when one wants to send data to the called party while a call is in progress.

DISCLOSURE OF THE INVENTION

Accordingly, an object of the present invention is to provide a method and an apparatus for message communication, which is capable of performing message communication accurately and at highspeed during a call.

To achieve the above-mentioned object, the invention of claim 1 is a method for message communication, which comprises a first telecommunications terminal and a second telecommunications terminal connected to the first telecommunications terminal via an integrated services digital network, and which communicates a predetermined message between the first telecommunications terminal and the second telecommunications terminal, characterized in that the method comprises the steps of:

disconnecting once a call between the first telecommunications terminal and the second telecommunications terminal when the call is in progress between the first telecommunications terminal and the second telecommunications terminal via the integrated service digital network;

performing a message transmission thereafter by attaching a desired message to call setting information and originating a call from the first telecommunications terminal or the second telecommunications terminal, which becomes a message transmitting terminal; and performing a message reception by the first telecommunications terminal or the second telecommunications terminal, which becomes a message receiving terminal, by receiving the desired message attached to the call setting information.

Further, the invention of claim 2 is characterized in that, in the invention of claim 1, the desired message is set in a subaddress of the call setting information.

Further, the invention of claim 3 is characterized in that, in the invention of claim 1, the first telecommunications terminal and the second telecommunications terminal are wired telecommunications terminals wire-connected to the integrated services digital network.

Further, the invention of claim 4 is characterized in that, in the invention of claim 1, the first telecommunications terminal and the second telecommunications terminal are wireless telecommunications terminals wirelessly-connected to a base station which is wire-connected to the integrated services digital network.

Further, the invention of claim 5 is characterized in that, in the invention of claim 1, at least one of the first telecommunications terminal and the second telecommunications terminal is a wireless telecommunications terminal wirelessly-connected to a base station which is wire-connected to the integrated services digital network.

Further, the invention of claim 6 is characterized in that, in the invention of claim 1, the call disconnection is performed correspondent to both a message transmitting operation at the message transmitting terminal and a message receiving operation at the message receiving terminal.

Further, the invention of claim 7 is characterized in that, in the invention of claim 1, the call disconnection is performed by transmitting a call disconnect signal to the message transmitting terminal from the message receiving terminal correspondent to a message receiving operation of the message receiving terminal and by responding to the receipt of the call disconnect signal at the message transmitting terminal.

Further, the invention of claim 8 is characterized in that, in the invention of claim 1, the call disconnection is performed by transmitting a call disconnect signal to the message receiving terminal from the message transmitting terminal correspondent to a message transmitting operation of the message transmitting terminal and by responding to the receipt of the call disconnect signal at the message receiving terminal.

Further, the invention of claim 9 is characterized in that, in the invention of claim 1, the call disconnection is performed by transmitting message mode alert information to the message receiving terminal from the message transmitting terminal correspondent to a message transmitting operation of the message transmitting terminal, by transmitting a call disconnect signal to the message transmitting terminal from the message receiving terminal correspondent to a message receiving operation based on reception of the message mode alert information at the message receiving terminal and by responding to the receipt of the call disconnect signal at the message transmitting terminal.

Further, the invention of claim 10 is characterized in that, in the invention of claim 1, the call setting information utilized at the message transmission is set on the basis of call setting information sent to the message receiving terminal from the message transmitting terminal when transitioning to the call between the first telecommunications terminal and the second telecommunications terminal.

Further, the invention of claim 11 is characterized in that, in the invention of claim 1, the call setting information utilized at the message transmission is set using call originator identification information sent to the message transmitting terminal from the message receiving terminal when transitioning to the call between the first telecommunications terminal and the second telecommunications terminal.

Further, the invention of claim 12 is a message communication apparatus, which comprises a first telecommunications terminal and a second telecommunications terminal connected to the first telecommunications terminal via an integrated service digital network, and which communicates a predetermined message between the first telecommunications terminal and the second telecommunications terminal, characterized in that the message communication apparatus comprises:

call disconnecting means for disconnecting once a call between the first telecommunications terminal and the second telecommunications terminal for communicating a desired message when a call is in progress between the first telecommunications terminal and the second telecommunications terminal via the integrated services digital network;

message transmitting means for performing a message transmission by attaching the desired message to call setting information and originating a call from the first telecommunications terminal or the second telecommunications terminal, which becomes the message transmitting terminal; and message receiving means for performing a message reception by receiving the desired message attached to the call setting information at the first telecommunications terminal or the second telecommunications terminal, which becomes the message receiving terminal.

Further, the invention of claim 13 is characterized in that, in the invention of claim 12, the call disconnecting means comprises:

first call disconnecting means, which is provided in the message transmitting terminal, for disconnecting the call correspondent to a predetermined message transmitting operation; and second call disconnecting means, which is provided in the message receiving terminal, for disconnecting the call correspondent to a predetermined message receiving operation.

Further, the invention of claim 14 is characterized in that, in the invention of claim 12, the call disconnecting means comprises:

call disconnect signal transmitting means, which is provided in the message receiving terminal, for transmitting a call disconnect signal to the message transmitting terminal from the message receiving terminal correspondent to a predetermined message receiving operation; and disconnecting means, which is provided in the message transmitting terminal, for disconnecting the call in response to the receipt of the call disconnect signal.

Further, the invention of claim 15 is characterized in that, in the invention of claim 12, the call disconnecting means comprises:

call disconnect signal transmitting means, which is provided in the message transmitting terminal, for transmitting a call disconnect signal to the message receiving terminal from the message transmitting terminal correspondent to a predetermined message receiving operation; and disconnecting means, which is provided in the message receiving terminal, for disconnecting the call in response to the receipt of the call disconnect signal.

Further, the invention of claim 16 is characterized in that, in the invention of claim 12, the call disconnecting means comprises:

message mode alert information transmitting means for transmitting message mode alert information to the message receiving terminal from the message transmitting terminal correspondent to a message transmitting operation of the message transmitting terminal;

call disconnect signal transmitting means, which is provided in the message receiving terminal, for transmitting a call disconnect signal to the message transmitting terminal from the message receiving terminal correspondent to a message receiving operation based on the receipt of the message mode alert information; and disconnecting means, which is provided in the message transmitting terminal, for disconnecting the call in response to the receipt of the call disconnect signal.

Further, the invention of claim 17 is characterized in that, in the invention of claim 12, the message transmitting means transmits the desired message by setting it in a subaddress of the call setting information, and the message receiving means performs the massage reception by extracting the desired message set in the subaddress of the call setting information.

Further, the invention of claim 18 is characterized in that, in the invention of claim 12, the first telecommunications terminal and the second telecommunications terminal are wired telecommunications terminals wire-connected to the integrated services digital network.

Further, the invention of claim 19 is characterized in that, in the invention of claim 12, the first telecommunications terminal and the second telecommunications terminal are wireless telecommunications terminals wirelessly-connected to a base station which is wire-connected to the integrated services digital network.

Further, the invention of claim 20 is characterized in that, in the invention of claim 12, at least one of the first telecommunications terminal and the second telecommunications terminal is a wireless telecommunications terminal wirelessly-connected to a base station which is wire-connected to the integrated services digital network.

Further, the invention of claim 21 is characterized in that, in the invention of claim 12, the message transmitting means performs the message transmission by originating a call to the message receiving terminal using call setting information which is set on the basis of call setting information sent to the message receiving terminal from the message transmitting terminal when transitioning to the call between the first telecommunications terminal and the second telecommunications terminal.

Further, the invention of claim 22 is characterized in that, in the invention of claim 1, the message transmitting means performs the message transmission by originating a call to the message receiving terminal using call setting information which is set using call originator identification information sent to the message transmitting terminal from the message receiving terminal when transitioning to the call between the first telecommunications terminal and the second telecommunications terminal.

Further, the invention of claim 23 is a message transmitting terminal connected to an integrated services digital network, characterized in that the message transmitting terminal comprises:
  call disconnecting means for disconnecting once a call with a message receiving terminal in order to transmit a desired message during the call with the message receiving terminal; and
  message transmitting means for performing a message transmission by attaching the desired message to call setting information and originating a call after disconnecting the call by the call disconnecting means.

Further, the invention of claim 24 is characterized in that, in the invention of claim 23, the message transmitting terminal is a wired communications terminal wire-connected to the integrated services digital network.

Further, the invention of claim 25 is characterized in that, in the invention of claim 23, the message transmitting terminal is a wireless communications terminal wirelessly-connected to a base station which is wire-connected to the integrated services digital network.

Further, the invention of claim 26 is characterized in that, in the invention of claim 23, the message transmitting means performs the message transmission by originating a call to the message receiving terminal using call setting information set on the basis of call setting information sent to the message receiving terminal when transitioning to the call between the first telecommunications terminal and the second telecommunications terminal.

Further, the invention of claim 27 is characterized in that, in the invention of claim 23, the message transmitting means performs the message transmission by originating a call to the message receiving terminal using call setting information set using call originator identification information received from the message receiving terminal when transitioning to the call between the first telecommunications terminal and the second telecommunications terminal.

Further, the invention of claim 28 is a message receiving terminal connected to an integrated services digital network, characterized in that the message receiving terminal comprises:
  call disconnecting means for disconnecting once a call with a message transmitting terminal in order to receive a desired message during the call with the message transmitting terminal; and
  message receiving means for receiving the desired message attached to call setting information sent from the message transmitting terminal after disconnecting the call by the call disconnecting means.

Further, the invention of claim 29 is characterized in that, in the invention of claim 28, the message receiving terminal is a wired communications terminal wire-connected to the integrated services digital network.

Further, the invention of claim 30 is characterized in that, in the invention of claim 23, the message receiving terminal is a wireless communications terminal wirelessly-connected to a base station, which is wire-connected to the integrated services digital network.

BEST MODE FOR CARRYING OUT THE INVENTION

The aspects of the embodiment of a method and an apparatus for message communication related to the present invention are explained in detail below with reference to the accompanying figures.

Figure 1:
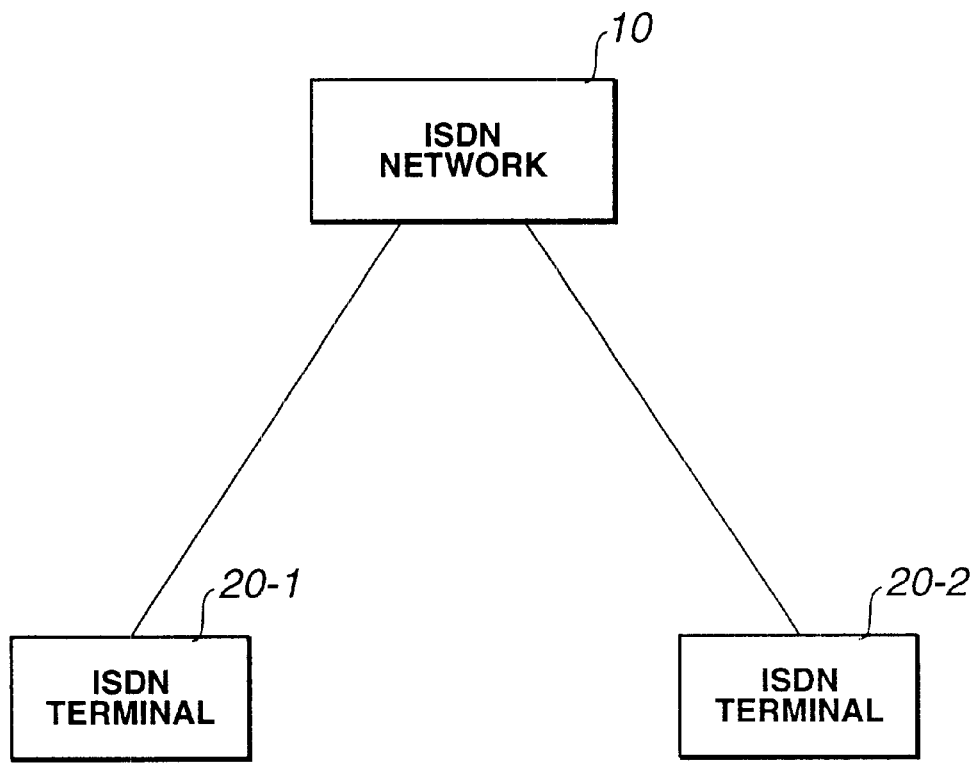
FIG. 1 is a block diagram showing an outline configuration of one aspect of the embodiment of a message communication system that applies to a method and an apparatus for message communication related to the present invention.

FIG. 1 shows an outline configuration of one aspect of the embodiment of a message communication system that applies to a method and an apparatus for message communication related to the present invention.

This message communication system comprises an ISDN network 10 and ISDN terminals 20-1, 20-2, which are wire-connected to this ISDN network 10.

And this message communication system is constituted so that a call can be made between ISDN terminal 20-1 and ISDN terminal 20-2 via ISDN network 10, and furthermore, so that a desired message can be transmitted in accordance with the procedures explained in detail below from ISDN terminal 20-1 to ISDN terminal 20-2, or from ISDN terminal 20-2 to ISDN terminal 20-1 while ISDN terminal 20-1 and ISDN terminal 20-2 are in the midst of a call.

Figure 2:
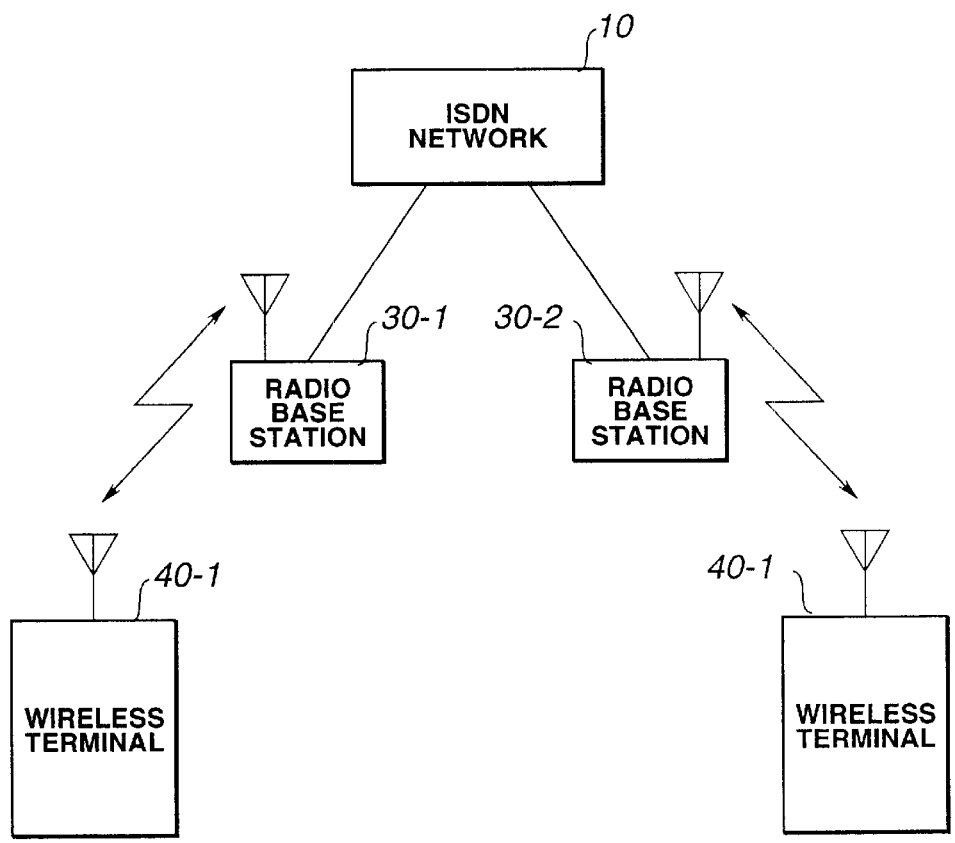
FIG. 2 is a block diagram showing an outline configuration of one aspect of the embodiment of a message communication system that applies to a method and an apparatus for message communication related to the present invention.

FIG. 2 shows an outline configuration of another aspect of the embodiment of a message communication system that applies to the method and apparatus for message communication related to the present invention.

This message communication system comprises an ISDN network 10, radio base stations 30-1, 30-2 wire-connected to this ISDN network 10, and wireless terminals 40-1, 40-2, which are wirelessly-connected to these respective radio base stations 30-1, 30-2.

And this message communication system is configured so that a call can be made between wireless terminal 40-1 and wireless terminal 40-2 via radio base station 30-1, ISDN network 10, and radio base station 30-2, and furthermore, so that a desired message can be transmitted in accordance with the procedures explained in detail below from wireless terminal 40-1 to wireless terminal 40-2, or from wireless terminal 40-2 to wireless terminal 40-1 while wireless terminal 40-1 and wireless terminal 40-2 are in the midst of a call.

Furthermore, in the configuration shown in FIG. 2, the wireless terminals 40-1, 40-2, may be, for example, wireless terminals such as PHS.

Figure 3:
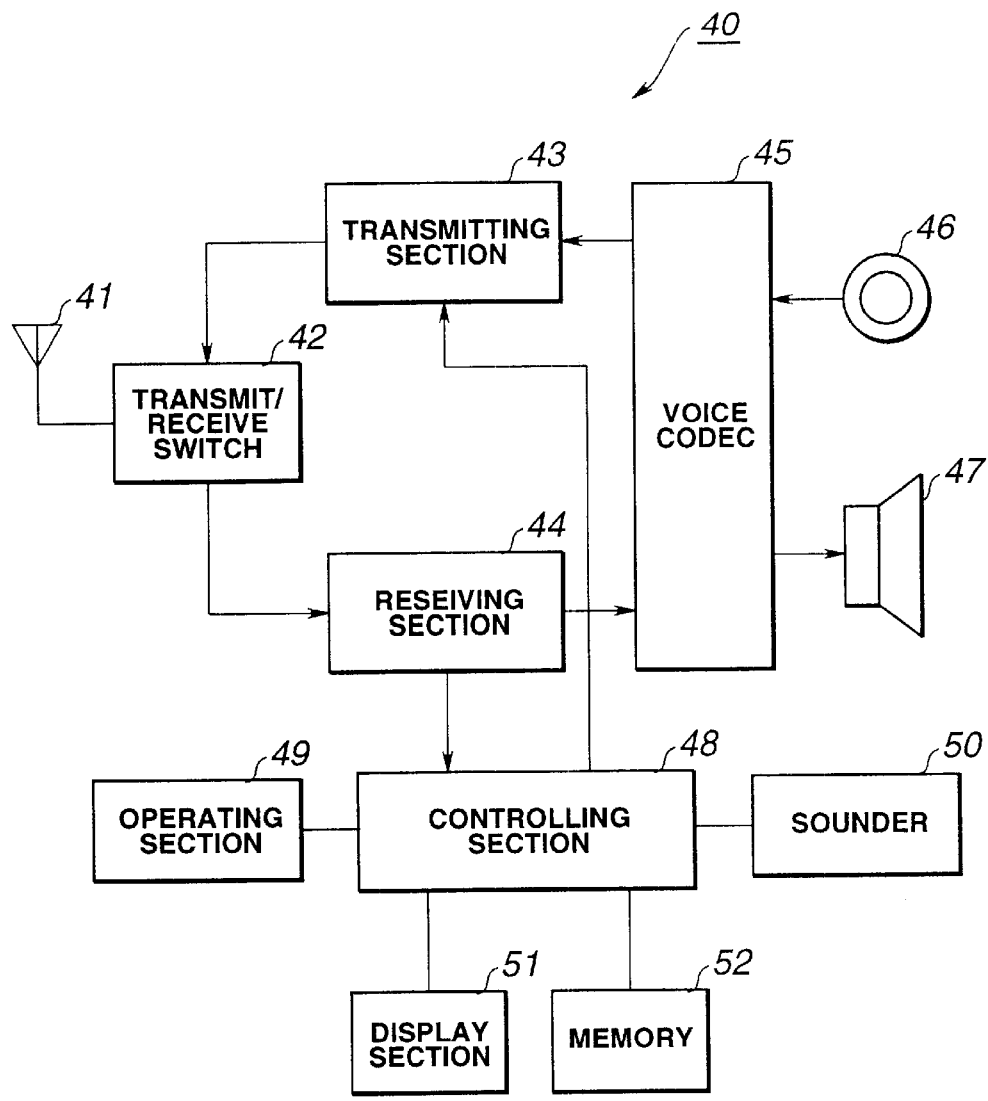
FIG. 3 is a block diagram of a detailed configuration when the wireless terminal indicated in FIG. 2 is a PHS wireless terminal.

FIG. 3 shows a detailed configuration of when the wireless terminals 40-1, 40-2 shown in the above FIG. 2 are PHS wireless terminals.

In FIG. 3, this PHS wireless terminal 40 comprises an antenna 41, a transmit/receive switch 42, a transmitting portion 43, a receiving portion 44, a voice CODEC 45, a microphone 46, a speaker 47, a controlling portion 48, an operating portion 49, a sounder 50, a display portion 51, and a memory 52.

Here, the voice CODEC 45 converts a voice signal (analog signal) inputted from the microphone 46 to digital information, outputs to the transmitting portion 43, converts digital information received by the receiving portion to a voice signal (analog signal), and outputs to the speaker 47.

Further, the transmitting portion 43 performs transmission processing on the digital information outputted from the voice CODEC 45, and the receiving portion 44 performs reception processing on a wireless signal received via the antenna 1.

Further, the microphone 46 functions as a telephone transmitting device for inputting a telephone-transmitted voice signal, the speaker 47 functions as a telephone receiving device for producing as speech inputted telephone-received voice signals, and the sounder 50 notifies of an incoming call.

This sounder 50 may be a speaker that notifies of an incoming call using an incoming call sound, or a vibrator that notifies of an incoming call by vibrating.

Further, the controlling portion 48 is constituted so as to perform general control of the overall operation of this PHS wireless terminal 40, being inputted with a reception control signal from the receiving portion 44, and outputting a transmission control signal to the transmitting portion 43.

Further, the operating portion 49 has a plurality of keys, and inputs all types of information, the display portion 51 displays the message information communicated using this embodiment, and memory 52 stores the message information communicated using this embodiment.

Now then, with this PHS wireless terminal 40, in an ordinary voice communication mode, speech corresponding to a received signal received via the antenna 41 is produced from the speaker 47, and a voice signal inputted from the microphone 46 is transmitted as a transmission signal from the antenna 42.

That is, a received signal received via the antenna 41 is inputted to the voice CODEC 45 via the transmit/receive switch 42 and receiving portion 44, where it is converted to a voice signal, inputted to the speaker 47, and produced as speech.

Further, a voice signal inputted from the microphone 46 is inputted to the voice CODEC 45, and after being converted to digital information here, is transmitted as a transmission signal from the antenna 41 via the transmitting portion 43, and transmit/receive switch 42.

Incidentally, with the present invention, message transmission in made possible from one telecommunications terminal to another telecommunications terminal in each telecommunications terminal calling state for the system configuration shown in FIG. 1 or the system configuration shown in FIG. 2.

That is, for the system configuration shown in FIG. 1, it is possible to transmit a desired message from ISDN terminal 20-1 to ISDN terminal 20-2, or from ISDN terminal 20-2 to ISDN terminal 20-1 while ISDN terminal 20-1 and ISDN terminal 20-2 are in the midst of a call.

Further, for the system configuration shown in FIG. 2, it is possible to transmit a desired message from wireless terminal 40-1 to wireless terminal 40-2, or from wireless terminal 40-2 to wireless terminal 40-1 while wireless terminal 40-1 and wireless terminal 40-2 are in the midst of a call.

Here, the transmission of this desired message is performed by using the call setting information utilized in ISDN terminal call connection.

However, in general, call setting information cannot be utilized in a state in which inter-terminal call connection is already complete.

Accordingly, with the present invention, when transmitting a message while a call is in progress, the connected call is disconnected one time, and message transmission is performed using the below-described call setting information, which is capable of being used in that state.

Furthermore, since the system configuration shown in FIG. 1, and the system configuration shown in FIG. 2 share a common basic telecommunications protocol, and differ only as to whether via a base station or not, the following explanation explains the message transmission procedure in terms of the trilateral relation of the message transmitting side, the ISDN network, and the message receiving side.

That is, in the system configuration shown in FIG. 1, when a message is sent from ISDN terminal 20-1 to ISDN terminal 20-2, ISDN terminal 20-1 becomes the message transmitting side, and ISDN terminal 20-2 becomes the message receiving side. And when message is sent from ISDN terminal 20-2 to ISDN terminal 20-1, ISDN terminal 20-2 becomes the message transmitting side, and ISDN terminal 20-1 becomes the message receiving side.

Further, in the system configuration shown in FIG. 2, when a message is sent from wireless terminal 40-1 to wireless terminal 40-2, wireless terminal 40-1 becomes the message transmitting side, and wireless terminal 40-2 becomes the message receiving side. And when message is sent from wireless terminal 40-2 to wireless terminal 40-1, wireless terminal 40-2 becomes the message transmitting side, and wireless terminal 40-1 becomes the message receiving side.

Figure 4:
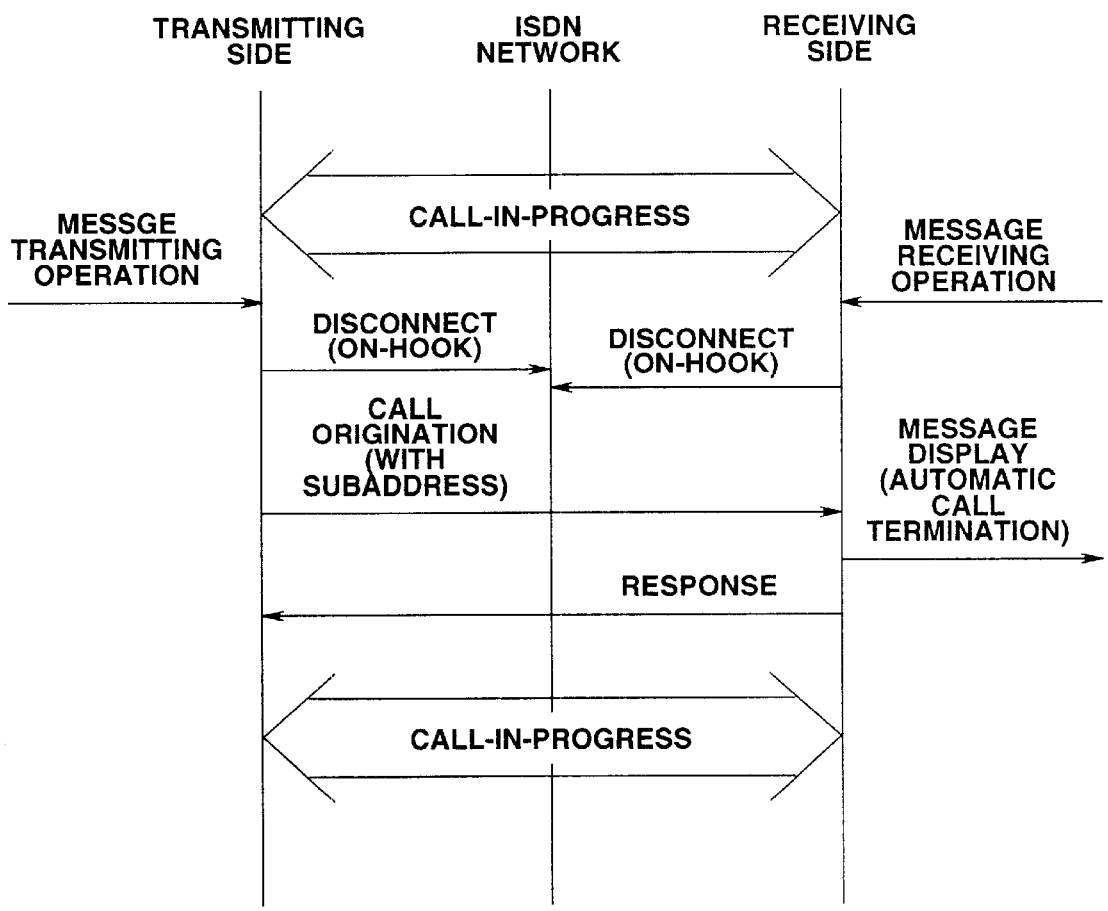
FIG. 4 is a sequence chart for the configurations of FIG. 1 and FIG. 2, showing one example of a message transmitting procedure, which transmits a message to a receiving side from a transmitting side while the transmitting side and the receiving side are in the midst of a call.

FIG. 4 shows via a sequence chart a message transmission procedure for transmitting a message from a message transmitting side (hereinafter referred to simply as transmitting side) to a message receiving side (hereinafter referred to simply as receiving side) while the transmitting side and the receiving side are in the midst of a call.

In FIG. 4, the operations up until the transmitting side and the receiving side are in the midst of a call prior to message transmission are the same as conventional procedures. Furthermore, an outline of the procedures up until the call-in-progress thereof is explained via the flowcharts in FIG. 5 and FIG. 6.

When the transmitting side transmits a message to the receiving side while the transmitting side and the receiving side are in the midst of a call, a notification to the effect that a message will be transmitted from the transmitting side to the receiving side, or to the effect that a message transmission from the receiving side to the transmitting side will be accepted, while the transmitting side and the receiving side are in the midst of a call is performed by voice.

In accordance therewith, the transmitting side and the receiving side carry out a message transmitting operation and a message receiving operation, respectively. The message transmitting operation and message receiving operation thereof are performed, for example, by either pressing a specified key, or by using a specified procedure to press a plurality of specified keys of the operating portion 49 shown in FIG. 3.

When a message transmitting operation is carried out, the transmitting side automatically transitions to the on-hook state, and sends a disconnect (on-hook) signal to the ISDN network.

Further, when a message receiving operation is carried out, the receiving side automatically transitions to the on-hook state, and sends a disconnect (on-hook) signal to the ISDN network.

In accordance therewith, the call between the transmitting side and the receiving side is disconnected.

In this state, the transmitting side sets a desired message in a subaddress of call setting information, and originates a call to the receiving side. This call setting information, which has the desired message set in a subaddress thereof, is transmitted from the transmitting side to the receiving side via the ISDN network.

When the receiving side receives this call setting information, which has the desired message set in a subaddress thereof, the call originated in accordance with this call setting information is automatically terminated, the above-mentioned desired message is read out from this call setting information subaddress, and this message is displayed, for example, on the display portion 51 shown in FIG. 3.

Then, when a response is made to the call originating in accordance with this call setting information, the transmitting side and the receiving side once again transition to call-in-progress.

Here, a call between the transmitting side and the receiving side is disconnected once for this message transmission, and then re-connected. But the transmitting side can transmit a message without being aware of this call disconnect at all, and the receiving side can receive a message without being aware of this call disconnect at all.

Furthermore, when transmitting a message from the transmitting side, a message set in a subaddress of call setting information at call origination is, for example, indicated by the above-mentioned message transmitting operation, and can be readily inputted by:

1) selecting, for example, a desired message from among a plurality of previously-set messages by pressing a ten-key pad or the like of the operating portion 49; and 2) selecting, for example, data stored in memory 52 by pressing a ten-key pad or the like of the operating portion 49.

Further, by selecting a message that has been previously set in both the transmitting side and receiving side by pressing a ten-key pad or the like of the operating portion 49, it is possible to transmit a message, and, in this case, it is also possible to forward, for example, diagrams and other complex data.

Further, because the originating call for the above-mentioned message transmission is a call to a party with whom a call has been in progress up until now, when the terminals are connected to an ISDN network, it is possible to learn the telephone number (call originator identification information) of the called party regardless of whether the call originator is the transmitting terminal or the receiving terminal, and if this called party s telephone number is stored in memory, a call can be originated using this stored called party telephone number without performing a re-dial operation.

Figure 5:
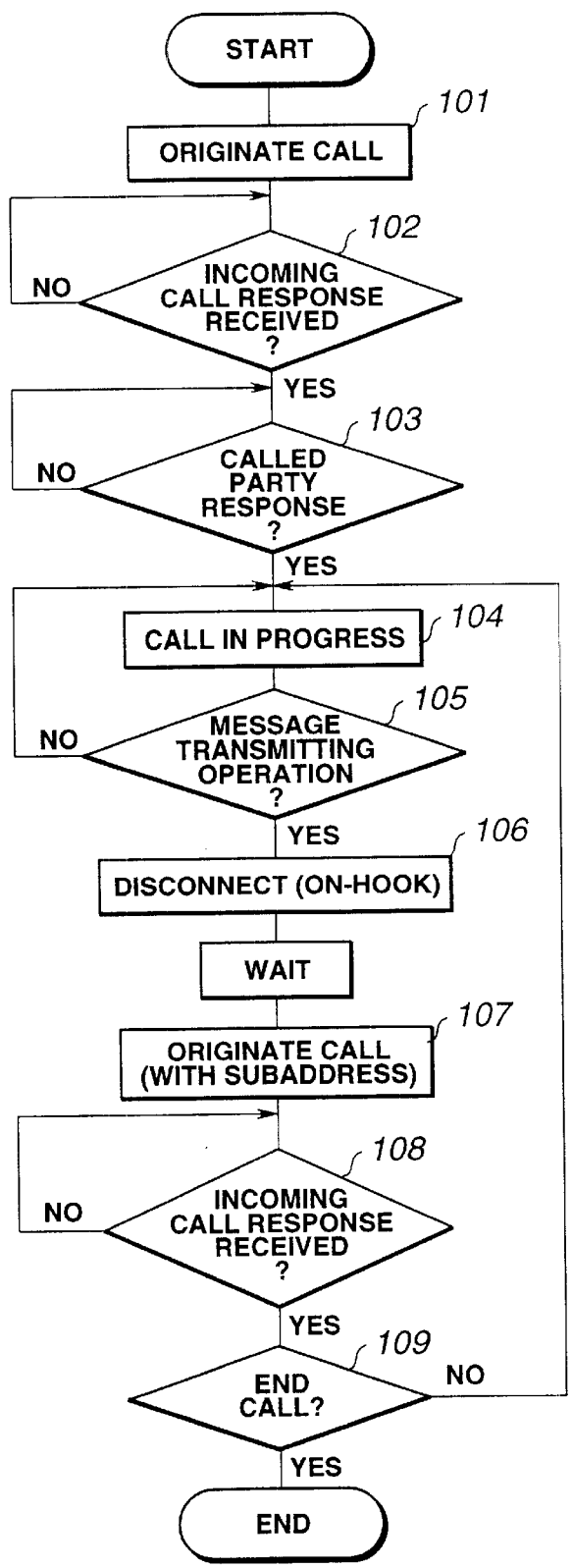
FIG. 5 is a flowchart showing the processing of the transmitting side when performing the message transmission illustrated in FIG. 4.
Figure 6:
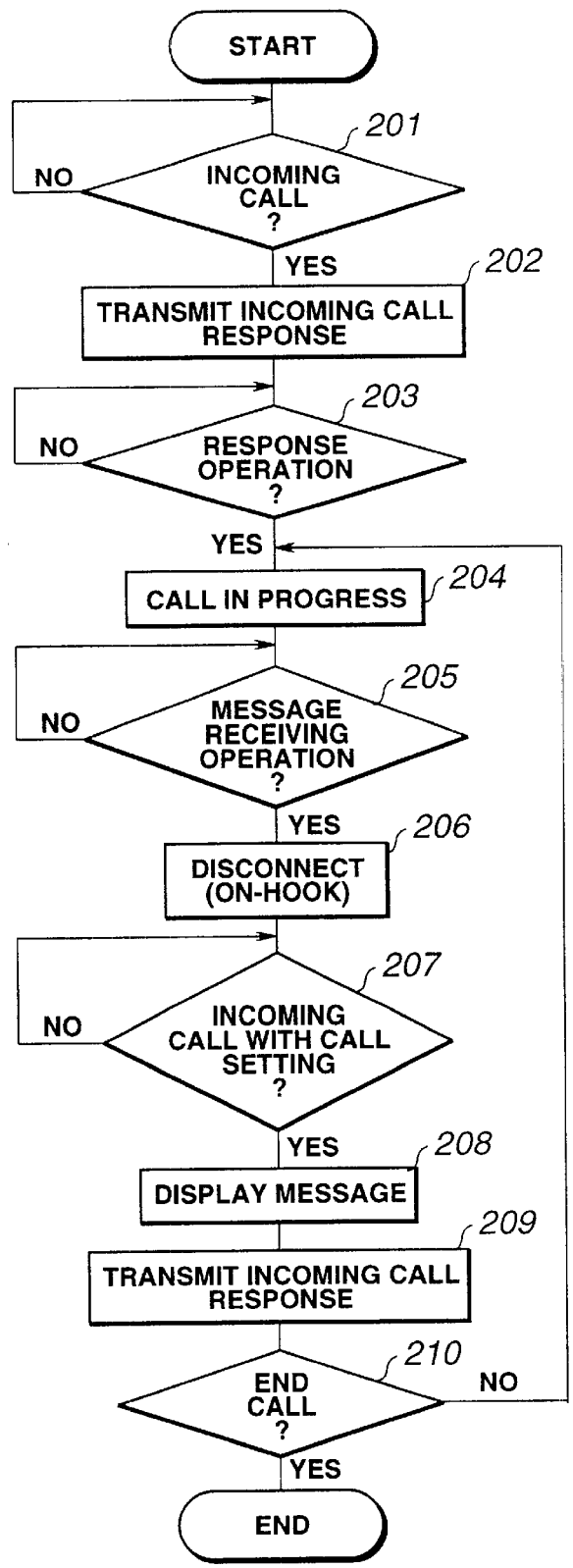
FIG. 6 is a flowchart showing the processing of the receiving side when performing the message transmission illustrated in FIG. 4.

FIG. 5 illustrates via a flowchart transmitting side processing when performing the message transmission shown in FIG. 4, and FIG. 6 illustrates via a flowchart receiving side processing when performing the message transmission shown in FIG. 4. Furthermore, FIG. 5 and FIG. 6 depict instances when the transmitting side originates a call in a process that leads to a call in progress between the transmitting side and the receiving side, but similarly, it is also possible to transition to the message transmitting state shown in FIG. 4 when the receiving side originates a call.

In FIG. 5, when a call is originated at the transmitting side (Step 101), waits for an incoming call response from the receiving side (Step 102). Here, the call originating from the transmitting side is performed by transmitting call setting information to the ISDN network, and the incoming call response from the receiving side is performed by receiving from the receiving side via the ISDN network a response to the call setting information sent to the ISDN network from the above-mentioned transmitting side.

Here, the ISDN network transmits a ringing tone to the receiving side from which an incoming call response was received. This ringing tone is transmitted to the receiving side directly in the system shown in FIG. 1, and via a base station in the system shown in FIG. 2, and rings, for example, the sounder 50 of FIG. 3.

In Step 102, when it is determined that the incoming call response from the receiving side has been received (Step 102: YES), next, a check is performed to determine called party response, that is, whether or not there was off-hook on the receiving side relative to the ringing tone, which was rung at the receiving side (Step 103).

At this point, once the called party response has been determined, the transmitting side and the receiving side transition to call-in-progress (Step 104).

When the transmitting side transmits a message to the receiving side in this state, a message transmitting operation is performed on the receiving side.

Next, a check is conducted to determine whether or not this message transmitting operation was performed (Step 105), and when it is determined that a message transmitting operation was performed (Step 105: YES), a disconnect (on-hook) signal is sent to the ISDN network (Step 106), and the call with the receiving side is disconnected.

Thereafter, following a specified waiting period, message transmission is performed by originating a call to the receiving side using call setting information, which has a desired message set in a subaddress (Step 107).

Next, waits for an incoming call response from the receiving side (Step 108), and when there is an incoming call response (Step 108: YES), next, a check is conducted to determine whether there was an end call operation (Step 109), and when there was an end call operation (Step 109: YES), this processing is brought to an end. When there is no end call operation (Step 109: NO), returns to Step 104, and transitions to call-in-progress with the receiving side.

On the receiving side indicated in FIG. 6, a check is performed to determine if there is an incoming call (Step 201), and when there is an incoming call (Step 201: YES), an incoming call response is transmitted (Step 202).

In this state, a ringing tone transmitted from the ISDN network is rung. Thereupon, if off-hook is performed in response to this ringing tone, the receiving side transitions to a call state with the transmitting side (Step 2040).

When a message from the transmitting side is received in this state, a message receiving operation is performed.

Accordingly, next a check is conduct to determine if this message receiving operation has been performed (Step 205), and when a message receiving operation has been performed (Step 205: YES), the ISDN network transmits a disconnect (on-hook) signal (Step 206), and the call with the transmitting side is disconnected.

Next, a check is performed to determine if there is an incoming call from the transmitting side in accordance with call setting information, which has a message set in a subaddress thereof (Step 207), and when there is an incoming call (Step 207: YES), the message transmitted from the transmitting side is read out from the subaddress of the call setting information related to this incoming call, and this message is displayed, for example, on the display portion 51 shown in FIG. 3 (Step 208).

Then, an incoming call response is transmitted to the transmitting side (Step 209). In this state, a ringing tone is transmitted from the ISDN network, but this ringing tone is not rung since the receiving side is in the message receiving mode.

Next, a check is performed to determine if there is an end call operation (Step 210), and when there is an end call operation (Step 210: YES), this processing is brought to an end. When there is no end call operation (Step 210: NO), returns to Step 204, and transitions to call-in-progress with the transmitting side.

Furthermore, the above-mentioned aspect of the embodiment is constituted so that the transmitting side and the receiving side perform a message transmitting operation and a message receiving operation, respectively, by issuing a notification by voice to the effect that a message will be transmitted from the transmitting side to the receiving side, or to the effect that a message transmission from the receiving side to the transmitting side will be accepted, while the transmitting side and the receiving side are in the midst of a call, and so that the call between the transmitting side and the receiving side is disconnected in response thereto by each performing on-hook. But it may be constituted so that a call is disconnected at either the transmitting side or the receiving side, and in response thereto, on-hook is performed at either the transmitting side or the receiving side.

Figure 7:
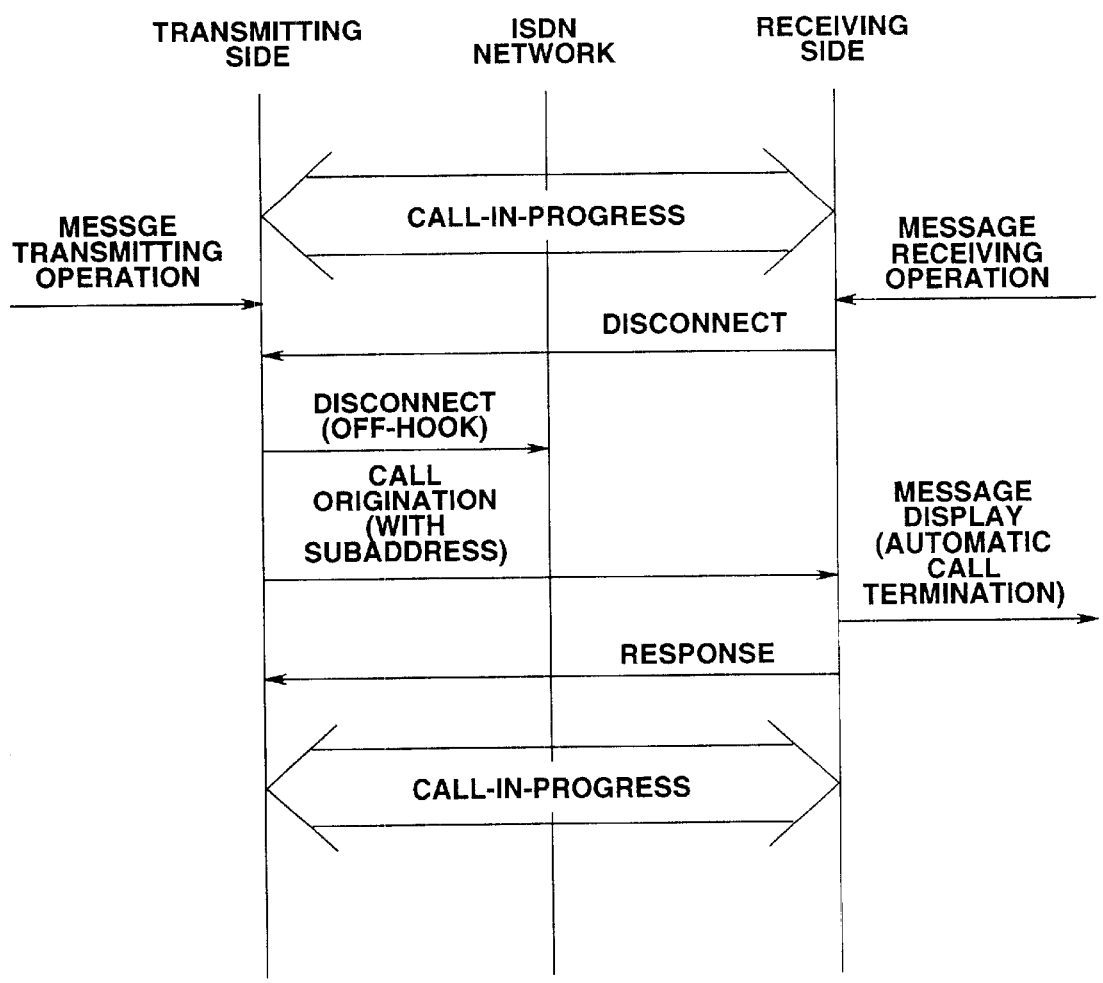
FIG. 7 is a sequence chart for the configurations shown in FIG. 1 and FIG. 2, showing another example of a message transmitting procedure, which transmits a message to a receiving side from a transmitting side while the transmitting side and receiving side are in the midst of a call.
Figure 8:
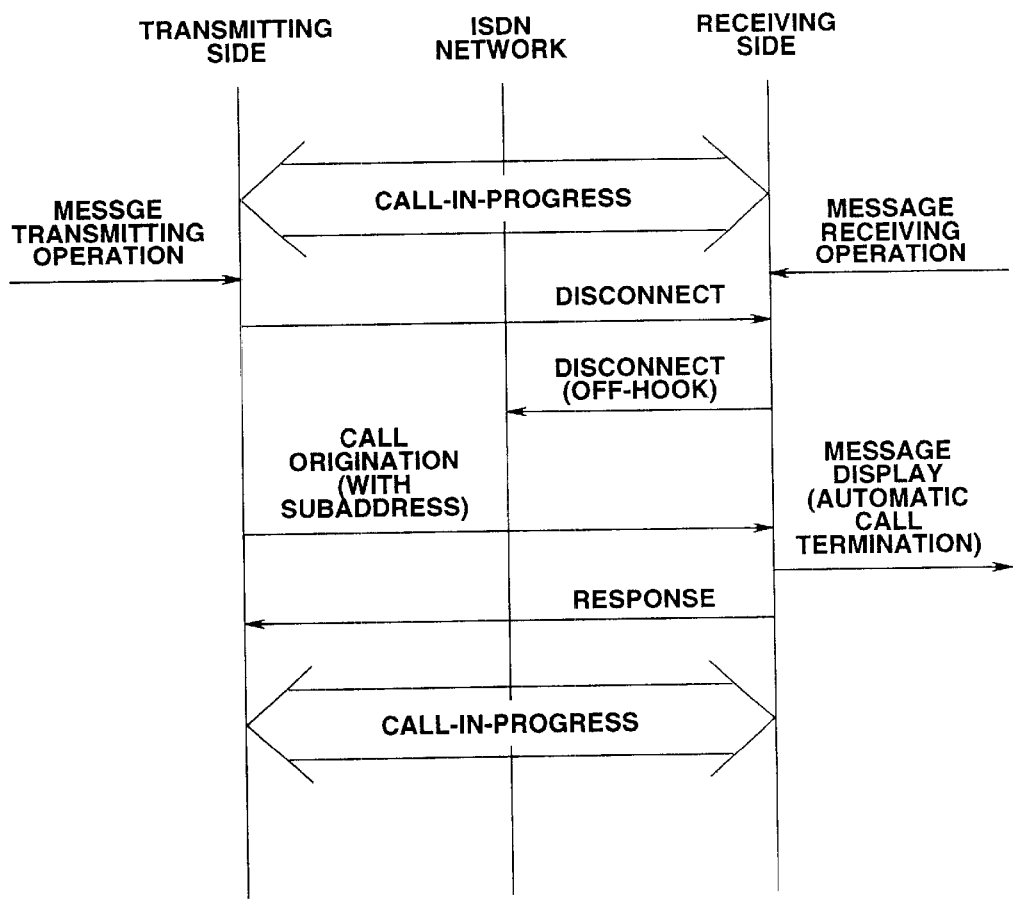
FIG. 8 is a sequence chart for the configurations shown in FIG. 1 and FIG. 2, showing yet another example of a message transmitting procedure, which transmits a message to a receiving side from a transmitting side while the transmitting side and receiving side are in the midst of a call.

FIG. 7 and FIG. 8 illustrate another aspect of the embodiment of the present invention constituted in this manner.

That is, in the sequence chart depicted in FIG. 7, after the transmitting side and the receiving side perform a message transmitting operation and a message receiving operation, respectively, a disconnect signal is sent via the ISDN network from the receiving side to the transmitting side.

On the transmitting side, this disconnect signal is received from the receiving side, and the call with the receiving side is disconnected by controlling the transmitting side in the on-hook state. The operations thereafter are the same as the operations shown in FIG. 4.

Further, in the sequence chart depicted in FIG. 8, after the transmitting side and the receiving side perform a message transmitting operation and a message receiving operation, respectively, a disconnect signal is sent via the ISDN network from the transmitting side to the receiving side.

On the receiving side, this disconnect signal is received from the transmitting side, and the call with the receiving side is disconnected by controlling the receiving side in the on-hook state. The operations thereafter are the same as the operations shown in FIG. 4.

Figure 9:
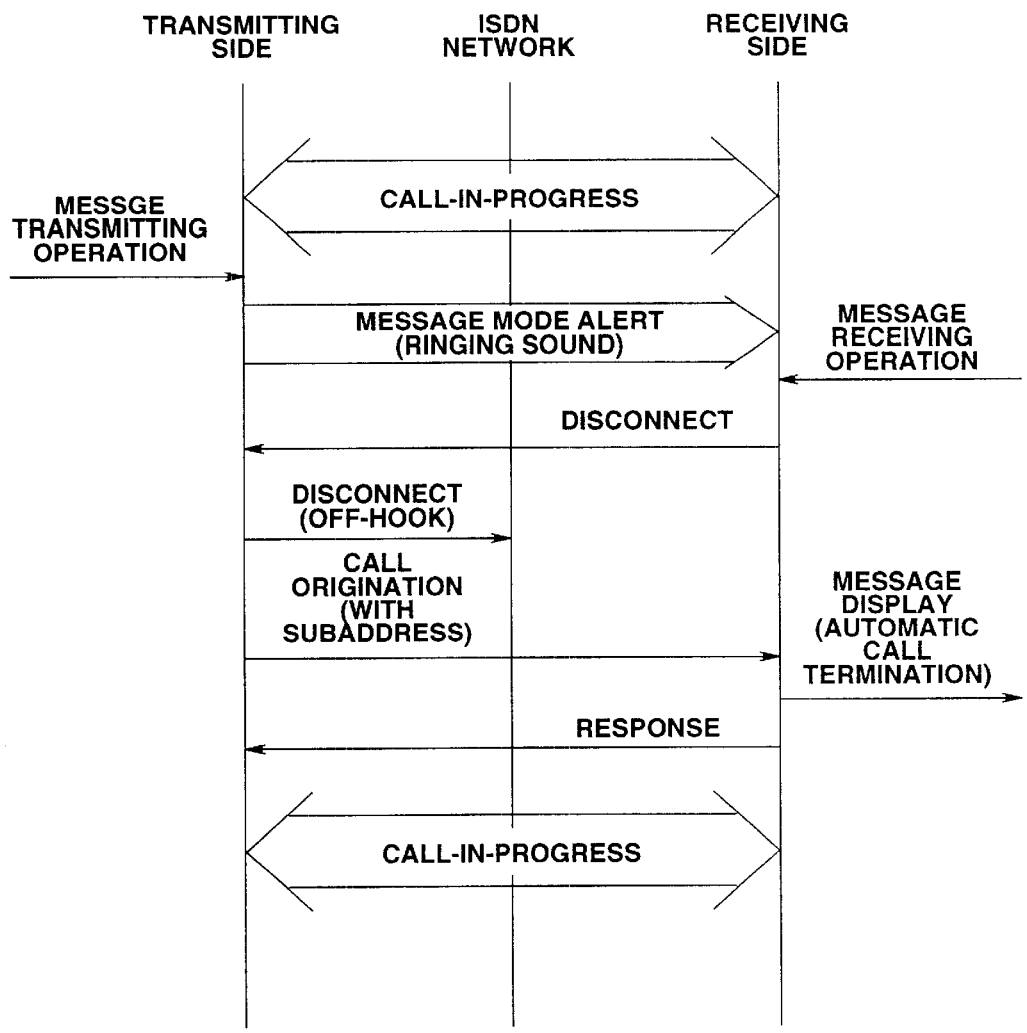
FIG. 9 is a sequence chart for the configurations shown in FIG. 1 and FIG. 2, showing yet another example of a message transmitting procedure, which transmits a message to a receiving side from a transmitting side while the transmitting side and receiving side are in the midst of a call.

FIG. 9 illustrates yet another aspect of the embodiment of the present invention.

In the sequence chart depicted in this FIG. 9, it is constituted so that a message alert, which states in effect that the transmitting side is entering the message mode, is issued from the transmitting side to the receiving side via the ISDN network in response to a message transmitting operation on the transmitting side, and a message receiving operation is implemented on the receiving side in response thereto.

That is, when a message is transmitted from the transmitting side to the receiving side while the transmitting side and the receiving side are in the midst of a call, when a message transmitting operation is implemented on the transmitting side, a message alert, which indicates, in effect, that the transmitting side will enter the message mode, is issued from the transmitting side to the receiving side via the ISDN network in response thereto. This alert is implemented, for example, by a ringing sound like "pi, pi, pi." This ringing sound is generated, for example, from the sounder 50 shown in FIG. 3.

The operator of the receiving side hears this ringing sound and performs the message receiving operation. In accordance with this message receiving operation, a disconnect signal is transmitted from the receiving side to the transmitting side via the ISDN network.

On the transmitting side, this disconnect signal is received from the receiving side, and the call with the receiving side is disconnected by controlling the transmitting side in the on-hook state. The operations thereafter are the same as the operations shown in FIG. 4.

Furthermore, for the sequence chart depicted in FIG. 9, it is constituted so that a message receiving operation is implemented on the receiving side in response to the issuing from the transmitting side to the receiving side of a message alert, indicating, in effect, that the transmitting side will enter the message mode, and a disconnect signal is transmitted from the receiving side to the transmitting side in accordance therewith. But this can also be constituted so that the receiving side transmits a disconnect signal to the transmitting side automatically in response to the message alert sent from the transmitting side.

FIG. 10 through FIG. 14 show specific examples of when the above-mentioned transmitted message is telephone directory data, that is, an aspect of the embodiment which realizes a telephone directory forwarding function for forwarding telephone directory data from the transmitting side to the receiving side.

Furthermore, this aspect of the embodiment is premised on the system configuration shown in FIG. 2, and specifies a case wherein the transmitting side and the receiving side are PHS terminals. Below, the transmitting side is called the transmitting side PS, and the receiving side is called the receiving side PS.

Further, this aspect of the embodiment is constituted so that telephone directory data to be forwarded is forwarded using a terminating subaddress and an originating subaddress of call setting information, being constituted so that "character information (name information)" of the telephone directory data to be forwarded is transmitted using the terminating subaddress, and "numerical information (2 telephone numbers)" is transmitted using the originating subaddress.

Further, this aspect of the embodiment is constituted so that telephone directory data forwarded in accordance with this telephone directory forwarding function is not only confirmed by being displayed on a display device of the receiving side PS, but can also be added/stored in telephone directory memory of the receiving side PS.

Figure 10:
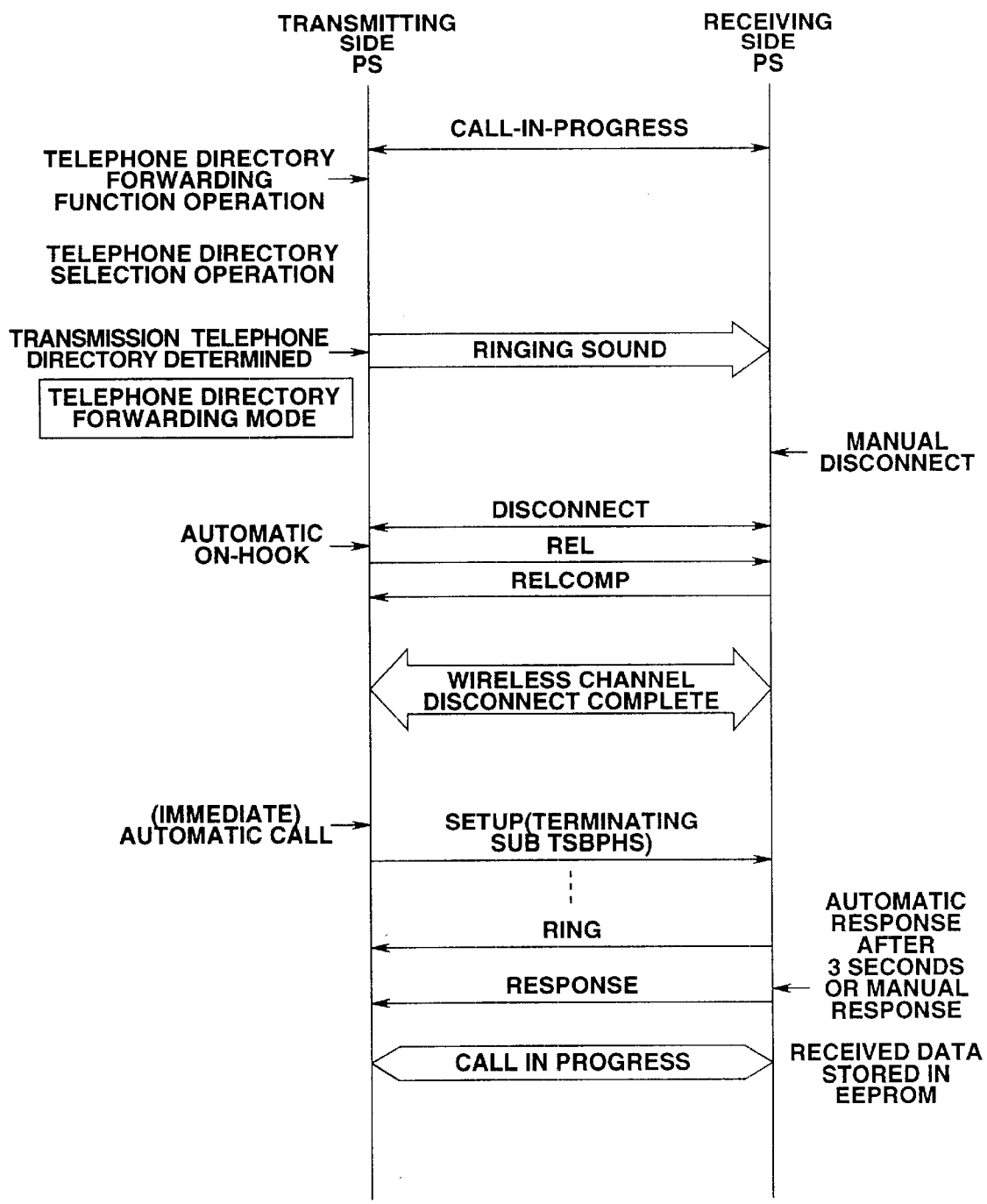
FIG. 10 is a sequence chart for the configuration shown in FIG. 2, showing a specific example of a telephone directory forwarding procedure, which transmits telephone directory data as a message to a receiving side from a transmitting side while the transmitting side and receiving side are in the midst of a call.

In FIG. 10, when the transmitting side PS and the receiving side PS are in the midst of a call, when a telephone directory forwarding function operation, that is, an "F" "O" "O" key operation is performed by the transmitting side PS, it enters the telephone directory forwarding mode, and when a telephone directory selecting operation is performed in this state, and the telephone directory to be transmitted is determined, a ringing sound, which indicates the transition to the telephone directory forwarding mode, is transmitted from the transmitting side PS to the receiving side PS.

The receiving side PS can enter the telephone directory forwarding mode by manually disconnecting a call with the transmitting side PS in response to this ringing sound.

When a call with the transmitting side PS is manually disconnected by the receiving side PS, a disconnect signal is transmitted from the receiving side PS to the transmitting side PS, and the transmitting side PS implements on-hook in response thereto.

Then, the call control signal REL (RELease), which indicates the release of the line, is transmitted from the transmitting side PS to the receiving side PS, and in response thereto, the call control signal RELCOMP (RELease COMPlete), which indicates that line release is complete, is transmitted from the receiving side PS to the transmitting side PS. In accordance therewith, the disconnection of the wireless channel between the transmitting side PS and the receiving side PS is complete.

When the disconnection of the wireless channel between the transmitting side PS and the receiving side PS is complete, the transmitting side PS at once automatically makes a call, and transmits SETUP (terminating subaddress TSBPHS) to the receiving side PS.

When the transmitting side PS is the call originating side terminal for this automatic call, the call can be automatically made using the telephone number used at call origination, and when it is the call terminating side terminal, the call can be automatically made using the telephone number transmitted from the party's terminal at call termination from the party's terminal.

Then, when the receiving side PS either automatically responds, or manually responds to this call within, for example, 3 seconds, it once again transitions to call-in-progress. Telephone directory data forwarded in accordance with the above-mentioned SETUP (terminating subaddress TSBPHS) is stored in the receiving side PS EEPROM, and thereafter, can be added/stored in receiving side PS telephone directory memory as needed.

Figure 11:
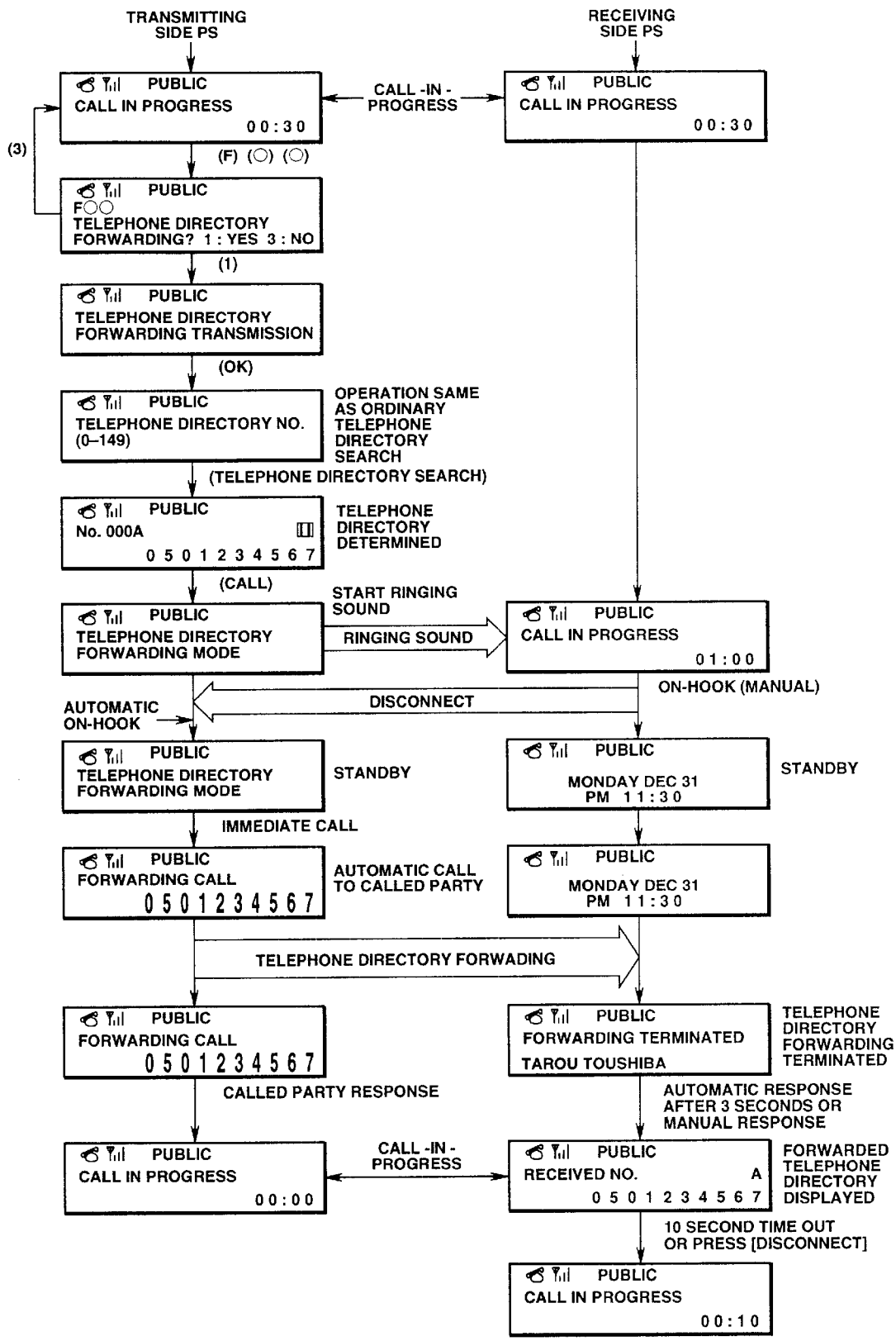
FIG. 11 is a diagram, which shows, in detail, the operation of the transmitting side PS and the receiving side PS for the telephone directory forwarding function illustrated in FIG. 10, and the various display device display contents thereof.

FIG. 11 shows, in detail, the operations of the transmitting side PS and the receiving side PS for the above-mentioned telephone directory forwarding function, and the various display device display contents thereof.

In FIG. 11, when the transmitting side PS and the receiving side PS are in "call-in-progress," when a telephone directory forwarding function operation, that is, an "F" "O" "O" key operation, is performed by the transmitting side PS, a selection screen of the telephone directory forwarding function is displayed on the display device of the transmitting side PS.

When "1" is keyed in here, it returns to "call-in-progress," but a "telephone directory forwarding transmission" display screen appears when "3" is keyed in, and a telephone directory search screen appears when "OK" is keyed in. At this point, an operation similar to an ordinary telephone directory search is performed, and the telephone directory to be forwarded is determined.

Then, when the "telephone" key is pressed, "telephone directory forwarding mode" is displayed, a ringing sound that indicates "telephone directory forwarding mode" is transmitted from the transmitting side PS to the receiving side PS, and this ringing sound commences at the receiving side PS.

When the receiving side PS implements on-hook in response to this ringing sound, a call disconnect signal is transmitted from the receiving side PS to the transmitting side PS.

The transmitting side PS automatically implements on-hook in response to receiving this call disconnect signal, and in accordance therewith, the call between the transmitting side PS and the receiving side PS is disconnected.

In this state, the transmitting side PS at once automatically makes a call (telephone directory forwarding call) to the receiving side PS. In this telephone directory forwarding call, name character information of the above-mentioned telephone directory data is automatically set in a specified area of a terminating subaddress of call setting information related to this telephone directory forwarding call, 2 telephone numbers data of the above-mentioned telephone directory data is automatically set in a specified area of a originating subaddress, and telephone directory data is forwarded to the receiving side PS from the transmitting side PS in accordance therewith.

When the receiving side PS either automatically responds, or manually responds to this telephone directory forwarding call after, for example, 3 seconds, the telephone directory data forwarded from the transmitting side PS in accordance with this telephone directory forwarding call is displayed on the display device of the receiving side PS, and thereafter, when, for example, either 10 seconds elapses, or the "disconnect" key is pressed, "call-in-progress" is displayed on the display devices of the transmitting side PS and the receiving side PS, and the transmitting side PS and the receiving side PS return to call-in-progress.

Here, the telephone directory data forwarded to the receiving side PS from the transmitting side PS in accordance with this telephone directory forwarding call is stored in an EEPROM, not shown in the figure, of the receiving side PS.

Figure 12:
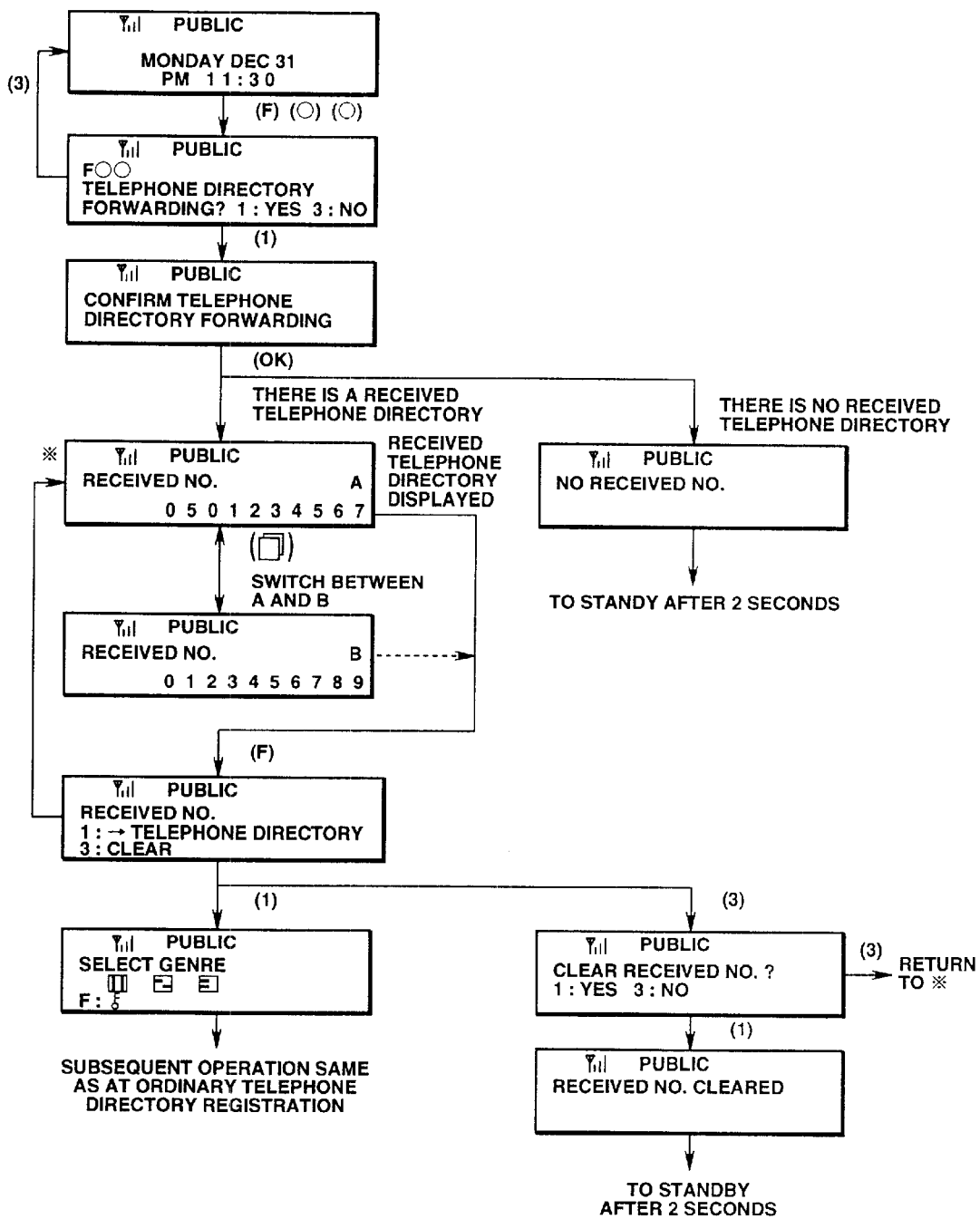
FIG. 12 is a diagram showing the processing for adding/storing in a telephone directory memory of a receiving side PS telephone directory data forwarded in accordance with the telephone directory forwarding function illustrated in FIG. 10.

FIG. 12 illustrates the process for adding/storing in receiving side PS telephone directory memory the telephone directory data forwarded from the transmitting side PS in accordance with the above-mentioned telephone directory forwarding call, and stored in the EEPROM of the receiving side PS.

When a telephone directory forwarding function operation, for example, an "F" "O" "O" key operation, is performed on the receiving side in a state, wherein the telephone directory data forwarded from the transmitting side PS is stored in the EEPROM of the receiving side PS, a selection screen of the telephone directory forwarding function is displayed on the display device of the receiving side PS.

Here, when "1" is keyed in, it returns to "call-in-progress," but a "telephone directory forwarding confirmation" display screen appears when "3" is keyed in, and when "OK" is keyed in here, the received telephone directory data, that is, the received telephone directory data stored in EEPROM, is displayed on the display device of the receiving side PS.

Here, since this aspect of the embodiment is constituted so as to forward 2 telephone numbers as the received telephone directory data, in displaying the received telephone directory data on the display device of the receiving side PS, these 2 telephone numbers can be switched and displayed.

Furthermore, when there is no received telephone directory data here, that is, when received telephone directory data is not stored in EEPROM, a display to the effect that there is no received telephone directory data appears on the display device of the receiving side PS, and thereafter, following an elapsed time of 2 seconds, it returns to stand-by.

When the "F" key is pressed in a state, wherein either one of the telephone numbers of the received telephone directory data is displayed on the display device of the receiving side PS, a selection screen appears querying as to whether the telephone number being displayed on the display device of the receiving side PS is to be stored in telephone directory memory, or deleted.

When the "disconnect" key is pressed here, it returns to the received telephone directory data display screen.

Further, when "1", which selects "store", is pressed, a "genre" selection screen appears, and the telephone directory data forwarded from the transmitting side PS in accordance with this telephone directory forwarding call can be stored in telephone directory memory using the same operation as the normal telephone directory storing operation that follows.

Further, when "3", which selects "delete", is pressed in the selection screen for determining whether the above-mentioned telephone number is to be stored in telephone directory memory, or deleted, a confirmation screen for determining whether this telephone directory data is to be deleted or not appears, and when "3" is pressed once again here, it returns to the received telephone directory data display screen, but when "1" is pressed, this telephone directory data is deleted, and following a display to this effect, it returns to stand-by after 2 seconds.

INDUSTRIAL APPLICABILITY

The present invention provides a method and an apparatus for message communication, which makes highspeed, high-quality message communication possible while a call is in progress. In accordance with the present invention, since the system is constituted so that when calling between a first telecommunications terminal and a second telecommunications terminal via an integrated services digital network, the call between a first telecommunications terminal and a second telecommunications terminal is disconnected one time, and thereafter, a message is transmitted by attaching a desired message to call setting information and originating a call from the first telecommunications terminal or the second telecommunications terminal, which becomes the message transmitting terminal, and so that the message is received by the fact that the first telecommunications terminal or the second telecommunications terminal, which becomes the message receiving terminal, receives the desired message attached to call setting information, it is possible to provide a method and an apparatus for message communication, which is capable of performing highspeed, accurate message communication even when a call is in progress.

What is claimed is:

1. A message communication method, which comprises a first telecommunications terminal and a second telecommunications terminal connected to the first telecommunications terminal via an integrated services digital network, and which communicates a predetermined message between the first telecommunications terminal and the second telecommunications terminal, characterized in that the method comprises:

a step of disconnecting once a call between the first telecommunications terminal and the second telecommunications terminal when the call is in progress between the first telecommunications terminal and the second telecommunications terminal via the integrated service digital network;

a step of attaching a desired message to call setting information transmitted from the first telecommunications terminal or the second telecommunications terminal, which becomes a message transmitting terminal, in order to reconnect the call between the first telecommunications terminal and the second telecommunications terminal after disconnecting the call between the first telecommunications terminal and the second telecommunications terminal; and a step of performing a message reception by the first telecommunications terminal or the second telecommunications terminal, which becomes a message receiving terminal, by extracting the desired message attached to the call setting information.

2. The message communication method according to claim 1, characterized in that the desired message is set in a subaddress of the call setting information.

3. The message communication method according to claim 1, characterized in that the first telecommunications terminal and the second telecommunications terminal are wired telecommunications terminals wire-connected to the integrated services digital network.

4. The message communication method according to claim 1, characterized in that the first telecommunications terminal and the second telecommunications terminal are wireless telecommunications terminals wirelessly-connected to a base station which is wire-connected to the integrated services digital network.

5. The message communication method according to claim 1, characterized in that at least one of the first telecommunications terminal and the second telecommunications terminal is a wireless telecommunications terminal wirelessly-connected to a base station which is wire-connected to the integrated services digital network.

6. The message communication method according to claim 1, characterized in that the call disconnect is performed correspondent to both a message transmitting operation at the message transmitting terminal and a message receiving operation at the message receiving terminal.

7. The message communication method according to claim 1, characterized in that the call disconnection is performed by transmitting a call disconnect signal to the message transmitting terminal from the message receiving terminal correspondent to a message receiving operation of the message receiving terminal and by responding to the receipt of the call disconnect signal at the message transmitting terminal.

8. The message communication method according to claim 1, characterized in that the call disconnection is performed by transmitting a call disconnect signal to the message receiving terminal from the message transmitting terminal correspondent to a message transmitting operation of the message transmitting terminal and by responding to the receipt of the call disconnect signal at the message receiving terminal.

9. The message communication method according to claim 1, characterized in that the call disconnection is performed by transmitting message mode alert information to the message receiving terminal from the message transmitting terminal correspondent to a message transmitting operation of the message transmitting terminal, by transmitting a call disconnect signal to the message transmitting terminal from the message receiving terminal correspondent to a message receiving operation based on reception of the message mode alert information at the message receiving terminal and by responding to the receipt of the call disconnect signal at the message transmitting terminal.

10. The message communication method according to claim 1, characterized in that the call setting information utilized at the message transmission is call setting information sent to the message receiving terminal from the message transmitting terminal when transitioning to the call between the first telecommunications terminal and the second telecommunications terminal by reconnecting the call between the first telecommunications terminal and the second telecommunications terminal.

11. The message communication method according to claim 1, characterized in that the call setting information utilized at the message transmission is call setting information set using call originator identification information sent to the message transmitting terminal from the message receiving terminal for transitioning to the call between the first telecommunications terminal and the second telecommunications terminal by reconnecting the call between the first telecommunications terminal and the second telecommunications terminal.

12. A message communication apparatus, which comprises a first telecommunications terminal; and a second telecommunications terminal connected to the first telecommunications terminal via an integrated service digital network, and which communicates a predetermined message between the first telecommunications terminal and the second telecommunications terminal, characterized in that the message communication apparatus comprises:

call disconnecting means for disconnecting once a call between the first telecommunications terminal and the second telecommunications terminal for communicating a desired message when a call is in progress between the first telecommunications terminal and the second telecommunications terminal via the integrated services digital network;

message transmitting means for performing a message transmission by attaching the desired message to call setting information transmitted from the first telecommunications terminal or the second telecommunications terminal, which becomes the message transmitting terminal in order to reconnect the call between the first telecommunications terminal and the second telecommunications terminal after disconnecting the call between the first telecommunications terminal and the second telecommunication terminal; and message receiving means for performing a message reception by extracting the desired message attached to the call setting information at the first telecommunications terminal or the second telecommunications terminal, which becomes the message receiving terminal.

13. The message communication apparatus according to claim 12, characterized in that the call disconnecting means comprises:

first call disconnecting means, which is provided in the message transmitting terminal, for disconnecting the call correspondent to a predetermined message transmitting operation; and second call disconnecting means, which is provided in the message receiving terminal, for disconnecting the call correspondent to a predetermined message receiving operation.

14. The message communication apparatus according to claim 12, characterized in that the call disconnecting means comprises:

call disconnect signal transmitting means, which is provided in the message receiving terminal, for transmitting a call disconnect signal to the message transmitting terminal from the message receiving terminal correspondent to a predetermined message receiving operation; and disconnecting means, which is provided in the message transmitting terminal, for disconnecting the call in response to the receipt of the call disconnect signal.

15. The message communication apparatus according to claim 12, characterized in that the call disconnecting means comprises:

call disconnect signal transmitting means, which is provided in the message transmitting terminal, for transmitting a call disconnect signal to the message receiving terminal from the message transmitting terminal correspondent to a predetermined message receiving operation; and disconnecting means, which is provided in the message receiving terminal, for disconnecting the call in response to the receipt of the call disconnect signal.

16. The message communication apparatus according to claim 12, characterized in that the call disconnecting means comprises:

message mode alert information transmitting means for transmitting message mode alert information to the message receiving terminal from the message transmitting terminal correspondent to a message transmitting operation of the message transmitting terminal;

call disconnect signal transmitting means, which is provided in the message receiving terminal, for transmitting a call disconnect signal to the message transmitting terminal from the message receiving terminal correspondent to a message receiving operation based on the receipt of the message mode alert information; and disconnecting means, which is provided in the message transmitting terminal, for disconnecting the call in response to the receipt of the call disconnect signal.

17. The message communication apparatus according to claim 12, characterized in that the message transmitting means performs the message transmission of the desired message by setting it in a subaddress of the call setting information, and the message receiving means performs the message reception by extracting the desired message set in the subaddress of the call setting information.

18. The message communication apparatus according to claim 12, characterized in that the first telecommunications terminal and the second telecommunications terminal are wired telecommunications terminals wire-connected to the integrated services digital network.

19. The message communication apparatus according to claim 12, characterized in that the first telecommunications terminal and the second telecommunications terminal are wireless telecommunications terminals wirelessly-connected to a base station which is wire-connected to the integrated services digital network.

20. The message communication apparatus according to claim 12, characterized in that at least one of the first telecommunications terminal and the second telecommunications terminal is a wireless telecommunications terminal wirelessly-connected to a base station which is wire-connected to the integrated services digital network.

21. The message communication apparatus according to claim 12, characterized in that the message transmitting means performs the message transmission by attaching the desired message to the call setting information sent to the message receiving terminal from the message transmitting terminal when transitioning to the call between the first telecommunications terminal and the second telecommunications terminal by reconnecting the call between the first telecommunications terminal and the second telecommunications terminal.

22. The message communication apparatus according to claim 12, characterized in that the message transmitting means performs the message transmission by attaching the desired message to the call setting information which is set using call originator identification information sent to the message transmitting terminal from the message receiving terminal when transitioning to the call between the first telecommunications terminal and the second telecommunications terminal by reconnecting the call between the first telecommunications terminal and the second telecommunications terminal.

23. A message transmitting terminal connected to an integrated services digital network, characterized in that the message transmitting terminal comprises:

call disconnecting means for disconnecting once a call with a message receiving terminal in order to transmit a desired message during the call with the message receiving terminal; and message transmitting means for performing a message transmission by attaching the desired message to call setting information transmitted for reconnecting with the message receiving terminal after disconnecting the call by the call disconnecting means.

24. The message transmitting terminal according to claim 23, characterized in that the message transmitting terminal is a wired communications terminal wire-connected to the integrated services digital network.

25. The message transmitting terminal according to claim 23, characterized in that the message transmitting terminal is a wireless communications terminal wirelessly-connected to a base station which is wire-connected to the integrated services digital network.

26. The message transmitting terminal according to claim 23, characterized in that the message transmitting means performs the message transmission by attaching the desired message to the call setting information sent to the message receiving terminal when transitioning to the call with the message receiving terminal by reconnecting with the message receiving terminal.

27. The message transmitting terminal according to claim 23, characterized in that the message transmitting means performs the message transmission by attaching the desired message to the call setting information set using call originator identification information received from the message receiving terminal when transitioning to the call with the message receiving terminal by reconnecting with the message receiving terminal.

28. A message receiving terminal connected to an integrated services digital network, characterized in that the message receiving terminal comprises:

call disconnecting means for disconnecting once a call with a message transmitting terminal in order to receive a desired message during the call with the message transmitting terminal; and message receiving means for extracting the desired message attached to call setting information sent from the message transmitting terminal for reconnection with the message receiving terminal after disconnecting the call by the call disconnecting means.

29. The message transmitting terminal according to claim 28, characterized in that the message receiving terminal is a wired communications terminal wire-connected to the integrated services digital network.

30. The message transmitting terminal according to claim 28, characterized in that the message receiving terminal is a wireless communications terminal wirelessly-connected to a base station, which is wire-connected to the integrated services digital network.

* * * * *